(12) United States Patent
Asakawa et al.

(10) Patent No.: US 12,060,492 B2
(45) Date of Patent: Aug. 13, 2024

(54) INK COMPOSITION AND RECORDING METHOD

(71) Applicant: Seiko Epson Corporation, Tokyo (JP)

(72) Inventors: Yuta Asakawa, Azumino (JP); Ippei Okuda, Shiojiri (JP); Mitsuaki Kosaka, Minowa (JP)

(73) Assignee: SEIKO EPSON CORPORATION (JP)

( * ) Notice: Subject to any disclaimer, the term of this patent is extended or adjusted under 35 U.S.C. 154(b) by 283 days.

(21) Appl. No.: 17/488,394

(22) Filed: Sep. 29, 2021

(65) Prior Publication Data

US 2022/0098428 A1   Mar. 31, 2022

(30) Foreign Application Priority Data

Sep. 30, 2020 (JP) .................. 2020-164597

(51) Int. Cl.
*C09D 11/36* (2014.01)
*B41J 2/01* (2006.01)
(Continued)

(52) U.S. Cl.
CPC ............... *C09D 11/36* (2013.01); *B41J 2/01* (2013.01); *B41J 2/2107* (2013.01); *C09D 11/322* (2013.01); *C09D 11/54* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; (Continued)

(56) References Cited

U.S. PATENT DOCUMENTS 6,500,248 B1   12/2002   Hayashi
2002/0075369 A1   6/2002   Ota et al.
(Continued)

FOREIGN PATENT DOCUMENTS

JP   2002020673 A   1/2002
JP   2006070105 A   3/2006
(Continued)

*Primary Examiner* — Manish S Shah
(74) *Attorney, Agent, or Firm* — Harness, Dickey & Pierce, P.L.C.

(57) ABSTRACT

An ink composition is used for recording on a low-absorbing recording medium or a non-absorbing recording medium and is an aqueous ink jet ink containing a pigment, and the ink composition includes 1.2 to 2.9 percent by mass of an amine with respect to a total mass of the ink composition, and an organic solvent other than an amine. The organic solvent includes an organic solvent having a standard boiling point of 150° C. to 250° C. in an amount of 5 to 30 percent by mass with respect to the total mass of the ink composition, and the organic solvent having a standard boiling point of 150° C. to 250° C. includes a diol having a water mixture viscosity of 3.0 mPa·s or more.

15 Claims, 1 Drawing Sheet

(51) Int. Cl.
*B41J 2/21* (2006.01)
*C09D 11/322* (2014.01)
*C09D 11/54* (2014.01)

(58) Field of Classification Search
CPC .... B41J 2/17553; B41J 2/1606; B41J 2/1642; B41J 2/1609; B41J 2/164; B41J 2/162; B41J 2/161; B41J 2/19; B41J 15/04; B41J 2/04588; B41J 2/04595; B41J 2/04586; B41J 2/14274; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | |
|---|---|---|
| 2013/0187998 A1 | 7/2013 | Ohmoto |
| 2015/0054883 A1* | 2/2015 | Okuda ................ C09D 11/322 |
| | | 524/556 |
| 2016/0017160 A2 | 1/2016 | Ohmoto |
| 2017/0165979 A1 | 6/2017 | Ohta |
| 2018/0244094 A1* | 8/2018 | Okuda ................... B41J 2/2107 |
| 2018/0281492 A1* | 10/2018 | Matsuzaki ................ B41J 2/01 |
| 2018/0282564 A1* | 10/2018 | Matsuzaki ............ C09D 11/322 |

FOREIGN PATENT DOCUMENTS

| | | |
|---|---|---|
| JP | 20110026545 A | 2/2011 |
| JP | 2012201814 A | 10/2012 |
| JP | 2013166364 A | 8/2013 |
| JP | 2017-109485 A | 6/2017 |
| JP | 2019094377 A | 6/2019 |
| WO | 00/22056 A1 | 4/2000 |

\* cited by examiner

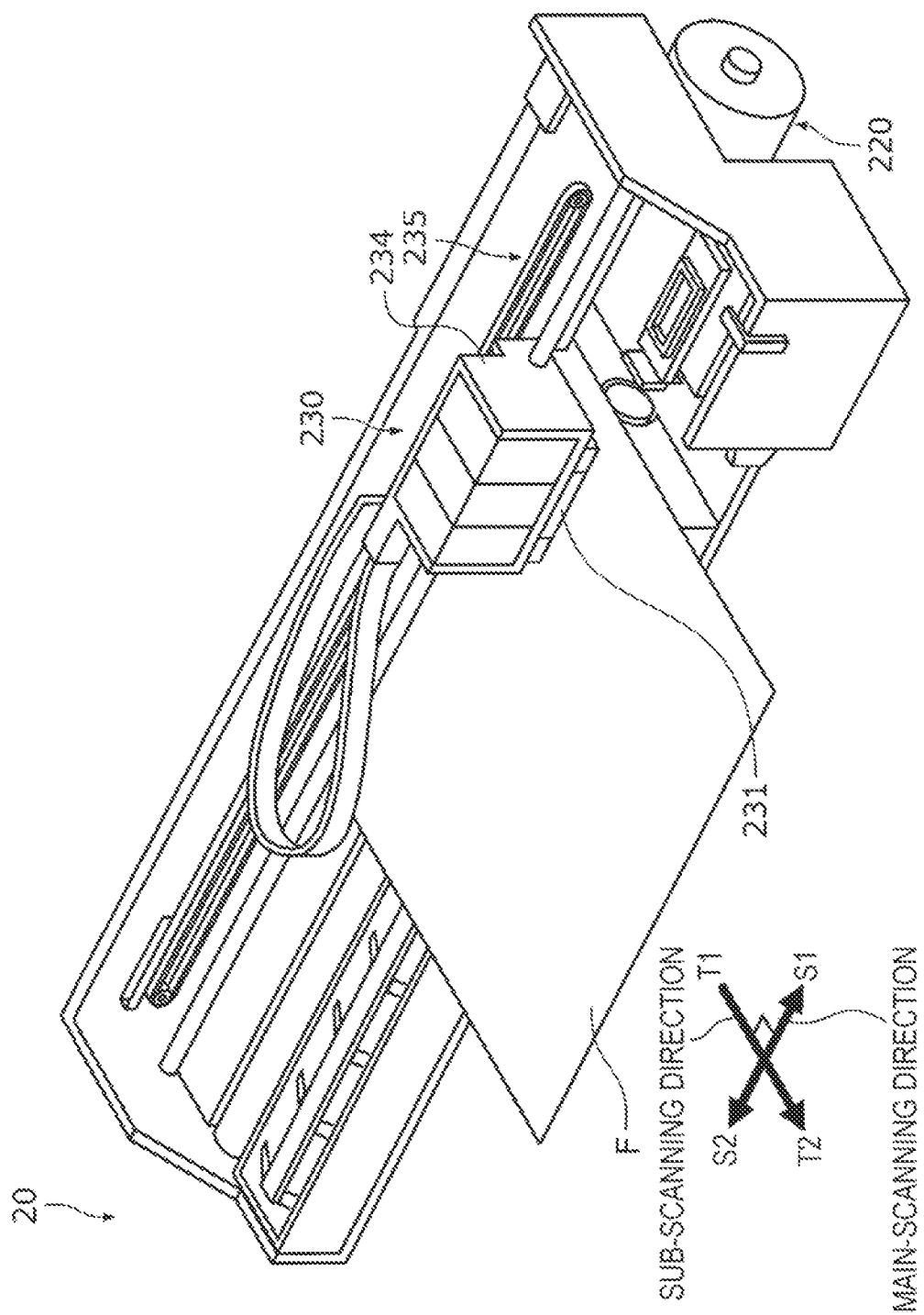

INK COMPOSITION AND RECORDING METHOD

The present application is based on, and claims priority from JP Application Serial Number 2020-164597, filed Sep. 30, 2020, the disclosure of which is hereby incorporated by reference herein in its entirety.

BACKGROUND

1. Technical Field

The present disclosure relates to an ink composition and a recording method.

2. Related Art

Since being capable of recording a highly fine image by a relatively simple apparatus, an ink jet recording method has been rapidly developed in various fields. In particular, various investigations, for example, on ejection stability have been carried out. For example, JP-A-2017-109485 has disclosed a recording method in which two types of inks are laminated to each other under predetermined conditions.

In recording on a low-absorbing recording medium or a non-absorbing recording medium, since an ink composition is not likely to be absorbed in the recording medium and is liable to remain thereon, ink dots on the recording medium are to be easily mixed together, and thereby bleeding may be generated in some cases, so that degradation in image quality may occur in some cases. In addition, in order to suppress the bleeding, even when an ink composition whose viscosity is configured to be increased is used, for example, a clogging recovery property may be degraded, and/or a drying property may also be degraded in some cases, so that an abrasion resistance of a recorded matter to be obtained may be degraded in some cases.

SUMMARY

According to an aspect of the present disclosure, there is provided an ink composition which is used for recording on a low-absorbing recording medium or a non-absorbing recording medium and which is an aqueous ink jet ink containing a pigment, the ink composition comprising: 1.2 to 2.9 percent by mass of an amine with respect to a total mass of the ink composition; and an organic solvent other than an amine. In addition, the organic solvent includes an organic solvent having a standard boiling point of 150° C. to 250° C. in an amount of 5 to 30 percent by mass with respect to the total mass of the ink composition, and the organic solvent having a standard boiling point of 150° C. to 250° C. includes a diol having a water mixture viscosity of 3.0 mPa·s or more.

In addition, according to another aspect of the present disclosure, there is provided a recording method comprising: an ink adhesion step of ejecting the ink composition described above by an ink jet method so as to be adhered to a low-absorbing recording medium or a non-absorbing recording medium.

BRIEF DESCRIPTION OF THE DRAWINGS

FIGURE is view showing one example of a recording apparatus to be used for a recording method of this embodiment.

DESCRIPTION OF EXEMPLARY EMBODIMENTS

Hereinafter, although an embodiment (hereinafter, referred to as "this embodiment") of the present disclosure will be described, if needed, with reference to the drawing, the present disclosure is not limited thereto and may be variously changed and/or modified without departing from the scope of the present disclosure. In addition, in the drawing, the same constituent element will be designated by the same reference numeral, and duplicated description will be omitted. In addition, a top-to-bottom and/or a right-to-left positional relationship is based on the positional relationship shown in the drawing unless otherwise particularly noted. Furthermore, a dimensional ratio in the drawing is not limited to that shown in the drawing.

1. Ink Composition

An ink composition of this embodiment is used for recording on a low-absorbing recording medium or a non-absorbing recording medium and is an aqueous ink jet ink containing a pigment. The ink composition described above contains 1.2 to 2.9 percent by mass of an amine with respect to a total mass of the ink composition and an organic solvent other than an amine, the organic solvent includes an organic solvent having a standard boiling point of 150° C. to 250° C. in an amount of 5 to 30 percent by mass with respect to the total mass of the ink composition, and the organic solvent having a standard boiling point of 150° C. to 250° C. includes a diol having a water mixture viscosity of 3.0 mPa·s or more.

The ink jet ink is an ink to be used for recording by an ink jet method. That is, the ink jet ink is an ink which is ejected from an ink jet head and is adhered to a recording medium so as to be used for recording.

In recording on a low-absorbing recording medium or a non-absorbing recording medium (hereinafter, simply referred to as "recording medium" in some cases), since an ink composition is not likely to be absorbed in the recording medium and is liable to remain thereon, ink dots on the recording medium are to be easily mixed together, and thereby bleeding may be generated in some cases, so that degradation in image quality may occur in some cases.

In general, since an organic solvent has a viscosity higher than that of water, when a content of the organic solvent in the ink composition is increased, the viscosity of the ink composition is increased, and hence, the flow of the ink dots on the recording medium can be suppressed. However, on the other hand, as the content of the organic solvent is increased, the drying property of the ink composition is degraded, and thereby the abrasion resistance is degraded.

On the other hand, according to this embodiment, since a predetermined amine and a predetermined diol are each used in a predetermined amount, while the content of the organic solvent is controlled in a predetermined range, the fluidity of ink dots on the recording medium is decreased, and hence, a pinning effect can be imparted to the ink composition. Accordingly, the mixing among the ink dots is avoided, and the bleeding can be suppressed from being generated. In addition, besides the above effects, the abrasion resistance of a recorded matter to be obtained can also be improved. Furthermore, since the components described above are contained, an appropriate moisture retaining property may also be imparted to the ink composition, and hence, an improvement in clogging recovery property can be not only realized, but the abrasion resistance, which has a general trade-off relationship with the moisture retaining property, can also be improved. Hereinafter, the components of the ink composition will be described in detail.

1.1. Amine

An amine can be expected to impart the pinning effect by a small content as compared to that of a diol which will be described later, and in addition, a dispersion stability of a pigment and the like can be not only improved, but the clogging recovery property may also be improved. In addition, since a content of the amine may be set to be relatively smaller than that of an organic solvent, the abrasion resistance may also be improved.

As the amine, for example, a primary amine, a secondary amine, and a tertiary amine may be used. The secondary amine or the tertiary amine is preferable, and the tertiary amine is more preferable. As the amine, an amine in which a hydrocarbon group bonded to a nitrogen atom of the amine is an aliphatic hydrocarbon group, an aromatic hydrocarbon group, or the like may be mentioned.

As the aliphatic hydrocarbon group bonded to a nitrogen atom of the amine, a substituted or unsubstituted alkyl group may be mentioned. The alkyl group has preferably 1 to 5 carbon atoms and more preferably 1 to 3 carbon atoms.

An alkanolamine in which an aliphatic hydrocarbon group is an alkyl group substituted by a hydroxy group is preferable. An alkylamine in which an aliphatic hydrocarbon group is an alkyl group not substituted by a hydroxy group may also be mentioned.

In addition, for example, a heterocyclic amine in which a nitrogen atom of the amine forms a hetero ring may also be mentioned.

Although the amine is not particularly limited, for example, there may be mentioned an alkanolamine (aminoalcohol), such as propanolamine, N,N-dimethylpropanolamine, N,N-diethylpropanolamine, isopropanolamine, diisopropanolamine, triisopropanolamine, N,N-dimethylisopropanolamine, N,N-diethylisopropanolamine, monoethanolamine, diethanolamine, triethanolamine, N,N-dimethylethanolamine, N,N-diethylethanolamine, N,N-dibutylethanolamine, N-aminoethylethanolamine, N-methylethanolamine, N-ethylethanolamine, N-butylethanolamine, N-tert-butylethanolamine, N-methyldiethanolamine, N-ethyldiethanolamine, N-butyldiethanolamine, N-tert-butyldiethanolamine, 2-amino-1-propanol, 2-amino-2-methyl-1-propanol, 5-amino-1-pentanol, 2-amino-2-methyl-1,3-propanediol, 2-amino-2-hydroxymethyl-1,3-propanediol, 3-amino-1,2-propanediol, or 3-methylamino-1,2-propanediol; a heterocyclic amine, such as morpholine, N-methylmorpholine, N-ethylmorpholine, N-(3-aminopropyl)morpholine, N-methylpiperidine, 1,4-dimethylpiperazine, or 1-piperidinoethanol; or an alkylamine, such as triethylamine, propylamine, or n-butylamine. Among those amines mentioned above, in view of odor and safety, the alkanolamine (aminoalcohol) is preferable.

The standard boiling point of the amine is preferably 80° C. or more, more preferably 120° C. or more, even more preferably 150° C. or more, further preferably 250° C. or more, and even further preferably 300° C. or more. In addition, the standard boiling point of the amine is preferably 350° C. or less, more preferably 340° C. or less, and further preferably 330° C. or less. Since the standard boiling point of the amine is the above lower limit or more, the image quality of the recorded matter to be obtained and the clogging recovery property tend to be further improved. In addition, since the standard boiling point of the amine is the above upper limit or less, the abrasion resistance of the recorded matter to be obtained tends to be further improved.

The water mixture viscosity of the amine is preferably 3.0 mPa·s or more, more preferably 3.2 to 6.0 mPa·s, and even more preferably 4.0 to 5.5 mPa·s. Furthermore, the water mixture viscosity is preferably 3.5 mPa·s or more and more preferably 3.6 mPa·s or more.

Since the water mixture viscosity of the amine is 3.0 mPa·s or more, the abrasion resistance and the image quality of the recorded matter to be obtained tend to be further improved. In addition, since the water mixture viscosity is 6.0 mPa·s or less, the clogging recovery property tends to be further improved.

In addition, in the present disclosure, a numerical range of "A" to "B" indicates the range of "A" or more and "B" or less.

in this specification, the "water mixture viscosity" indicates a viscosity at 20° C. of a water mixture liquid (that is, an aqueous solution at a concentration of 30 percent by mass) obtained by mixing 70 percent by mass of water and 30 percent by mass of a compound which is an object whose viscosity is to be measured. The viscosity described above may be measured, for example, using a rotatory viscometer. Although the viscometer is not particularly limited, for example, a rheometer (MCR 302, manufactured by Anton Paar) may be used. The measurement is conducted at 20° C.

For example, the measurement may be conducted in accordance with JIS 28809.

A content of the amine with respect to the total mass of the ink composition is 1.2 to 2.9 percent by mass, preferably 1.3 to 2.8 percent by mass, and more preferably 1.4 to 2.7 percent by mass. Furthermore, the content described above is preferably 1.4 to 2.5 percent by mass and more preferably 1.4 to 2.0 percent by mass.

Since the content of the amine is 1.2 percent by mass or more, the image quality of the recorded matter to be obtained and the clogging recovery property are further improved. In addition, since the content of the amine is 2.9 percent by mass or less, the abrasion resistance of the recorded matter to be obtained and the storage stability are further improved.

1.2. Organic Solvent

Although the organic solvent is not particularly limited, for example, there may be mentioned a diol, a polyol (polyol having at least three alcohol functional groups) other than a diol, an alcohol, a nitrogen-containing solvent, a sulfur-containing solvent, a cyclic ester, a glycol monoether, a glycol diether (glyme), or a cyclic ether. Among those mentioned above, the diol and at least one of resin solvents which will be described below are preferably contained. Since the solvents as described above are contained, the image quality, the abrasion resistance, and the clogging recovery property tend to be further improved.

In addition, in this specification, the concept of the organic solvent includes no amines. In addition, as described below, the nitrogen-containing solvent, the sulfur-containing solvent, the cyclic ester, the cyclic ether, and the glycol diether are collectively called resin solvents.

In this embodiment, as the organic solvent, besides an organic solvent in the form of a liquid at ordinary temperature and ordinary pressure, although being in the form of a solid at ordinary temperature and ordinary pressure, an organic solvent which is well dissolved in water to form an aqueous solution at ordinary temperature and ordinary pressure may also be used. In particular, when a compound and water are mixed together at a mass ratio of 30:70, and the mixture thus formed is well mixed at ordinary temperature and ordinary pressure to form an aqueous solution, the compound can be regarded as the organic solvent. In addition, the organic solvent is preferably in the form of a liquid at ordinary temperature and ordinary pressure.

In addition, the ink composition of this embodiment contains 5 to 30 percent by mass of an organic solvent having a standard boiling point of 150° C. to 250° C. with respect to the total mass of the ink composition.

Since the organic solvent is contained in the structure as described above, the drying property of the ink composition can be improved, and the abrasion resistance of the recorded matter to be obtained is further improved, and in addition to the above advantages, the moisture retaining property of the ink composition can be improved, and the clogging recovery property is further improved. In addition, a content of the organic solvent having a standard boiling point of 150° C. to 250° C. with respect to the total mass of the ink composition is 5 to 30 percent by mass, preferably 7.5 to 27.5 percent by mass, and more preferably 10 to 25 percent by mass. Furthermore, the content described above is preferably 15 to 23 percent by mass and more preferably 18 to 21 percent by mass.

Since the content of the organic solvent having a standard boiling point of 150° C. to 250° C. is in the range described above, while the image quality is improved, the abrasion resistance and the clogging recovery property are further improved.

The total content of all the organic solvents contained in the ink composition of this embodiment is preferably 5 percent by mass or more, more preferably 7.5 percent by mass or more, and further preferably 10 percent by mass or more. In addition, the total content of all the organic solvents contained in the ink composition of this embodiment is preferably 40 percent by mass or less, more preferably 35 percent by mass or less, and further preferably 30 percent by mass or less. Furthermore, the total content described above is preferably 15 to 25 percent by mass and more preferably 18 to 23 percent by mass.

Since the content of all the organic solvents is in the range described above, the image quality, the abrasion resistance, and the clogging recovery property are further improved.

1.2.1. Diol

Since having an excellent moisture retaining property and a high hydrophilic property among organic solvents, the diol is likely to maintain a dispersion stability of pigment particles and/or resin particles, and hence, the clogging recovery property of the ink composition is improved. In addition, since a diol having a high viscosity and a boiling point in a predetermined range is used, besides the above clogging recovery property, the abrasion resistance can be improved, and the image quality can also be improved by suppressing the fluidity of the ink dots.

From the point described above, as the diol, a diol having a standard boiling point of 150° C. to 250° C. and a water mixture viscosity of 3.0 mPa·s or more is used. Since the diol as described above is used, the image quality, the abrasion resistance, and the clogging recovery property are further improved. Besides the diol described above, at least one diol other than that described above may also be used.

As the diol, a diol having a standard boiling point of 150° C. to 250° C. is used, and the standard boiling point of the diol is preferably 155° C. to 245° C., more preferably 160° C. to 240° C., even more preferably 170° C. to 220° C., and further preferably 180° C. to 200° C.

Since the standard boiling point of the diol is in the range described above, the image quality, the abrasion resistance, and the clogging recovery property are further improved.

As the diol, a diol having a water mixture viscosity of 3.0 mPa·s or more is used, and the water mixture viscosity of the diol is preferably 3.0 to 5.5 mPa·s and more preferably 3.0 to 5.0 mPa·s. Furthermore, the water mixture viscosity of the diol is preferably 3.1 to 4.0 mPa·s and more preferably 3.2 to 3.5 mPa·s.

Since the water mixture viscosity of the diol is in the range described above, the image quality and the clogging recovery property are further improved.

The diol is a compound having two hydroxy groups in its molecule. Although the diol is not particularly limited, for example, there may be mentioned an alkanediol or an intermolecular OH condensate (polyglycol) between alkanediols.

As the diol, for example, an alkanediol having at least two carbon atoms or an intermolecular OH condensate between the alkanediols may be mentioned. In the alkanediol and the intermolecular OH condensate between the alkanediols, the number of carbon atoms of the alkanediol is preferably 2 to 8, more preferably 2 to 5, and further preferably 2 to 3. When the diol is the intermolecular OH condensate between the alkanediols, the number of condensations thereof is 2 or more, preferably 2 to 5, and more preferably 2 to 3.

As the diol, in more particular, for example, there may be mentioned propylene glycol, hexylene glycol (2-methyl-2,4-pentanediol), triethylene glycol, ethylene glycol, tetraethylene glycol, pentaethylene glycol, dipropylene glycol, diethylene glycol, 1,3-propanediol, 2-butene-1,4-diol, 2-ethyl-1,3-hexanediol, 2-methyl-1,3-propanediol, neopentyl glycol, 2,2-diethyl-1,3-propanediol, 2-methyl-2-propyl-1,3-propanediol, 1,2-butanediol, 1,3-butanediol, 1,4-butanediol, 1,2-pentanediol, 1,5-pentanedil, 1,2-hexanediol, 1,6-hexanediol, 1,2-octanediol, 3-methyl-1,3-butanediol, 3-methyl-1,5-pentanediol, 4-methyl-1,2-pentanediol, or 2,2,4-trimethyl-1,3-pentanediol.

In addition, the ink composition of this embodiment at least contains, among the diols mentioned above, a diol having a standard boiling point of 150° C. to 250° C. and a water mixture viscosity of 3.0 mPa·s or more.

A content of the diol with respect to the total mass of the ink composition is preferably 0.5 to 30 percent by mass, more preferably 1 to 20 percent by mass, even more preferably 3 to 15 percent by mass, and further preferably 5 to 10 percent by mass. Since the content of the diol is in the range described above, the image quality, the abrasion resistance, and the clogging recovery property tend to be further improved.

In particular, a content of the diol having a standard boiling point of 150° C. to 250° C. and a water mixture viscosity of 3.0 mPa·s or more is 30 percent by mass or less with respect the ink and is preferably in the range described above.

1.2.2. Resin Solvent

The resin solvent indicates at least one of a nitrogen-containing solvent, a sulfur-containing solvent, a cyclic ester, a cyclic ether, and a glycol diether. The resin solvent is an organic solvent which has a relatively high hydrophobic property and which is likely to dissolve a resin. However, the resin solvent is not limited to having the functions described above, and any one of the organic solvents mentioned above may be used. By using the resin solvent as described above, when the ink composition is dried on the recording medium, and a concentration of the resin solvent is increased, the resin solvent dissolves a resin in the ink, and a coating film of the ink is not only planarized, but also the viscosity of the ink dots is increased. Accordingly, the abrasion resistance of the recorded matter to be obtained is improved. In addition, since the resin in the ink is dissolved, the viscosity of the ink is increased, and as a result, the image quality tends to be further improved. In addition, depending on a material of the recording medium, the resin solvent may be able to dissolve and swell the surface of the recording medium. Accordingly, since the adhesion of the ink composition is improved, the abrasion resistance of the recorded matter to be obtained is improved, and in addition, since the ink dots are not likely to flow, the image quality tends to be further improved.

The standard boiling point of the resin solvent is preferably 150° C. or more, more preferably 170° C. or more, even more preferably 185° C. or more, and further preferably 200° C. or more. In addition, the standard boiling point of the resin solvent is preferably 300° C. or less, more preferably 285° C. or less, even more preferably 270° C. or less, further preferably 250° C. or less, and even further preferably 230° C. to 250° C.

Since the standard boiling point of the resin solvent is the above lower limit or more, the resin solvent is further not likely to be vaporized and is likely to remain on the recording medium, and in addition, since the resin in the ink or a resin of the recording medium becomes more likely to be dissolved, the abrasion resistance and the image quality of the recorded matter to be obtained tend to be further improved.

From the point described above, the standard boiling point of the resin solvent is preferably higher than the standard boiling point of the diol, is preferably higher by 5° C. or more, and more preferably higher by 10° C. to 50° C.

On the other hand, since the standard boiling point of the resin solvent is the above upper limit or less, the recorded matter to be obtained is more likely to be dried, and the abrasion resistance thereof tends to be further improved.

The water mixture viscosity of the resin solvent is preferably 2.0 mPa·s or more, more preferably 2.2 to 4.0 mPa·s, even more preferably 2.4 to 3.5 mPa·s, and further preferably 2.5 to 3.3 mPa·s.

Since the water mixture viscosity of the resin solvent is in the range described above, the image quality and the clogging recovery property tend to be further improved.

A content of the resin solvent with respect to the total mass of the ink composition is preferably 5 to 25 percent by mass, more preferably 7.5 to 20 percent by mass, and further preferably 10 to 15 percent by mass. Since the content of the resin solvent is in the range described above, the image quality, the abrasion resistance, and the clogging recovery property tend to be further improved.

1.2.2.1. Nitrogen-Containing Solvent

The nitrogen-containing solvent is an organic solvent including a nitrogen atom in its molecule. For example, an amide compound (amide solvent) may be mentioned. As the amide, for example, a cyclic amide or a non-cyclic amide may be mentioned.

Although the nitrogen-containing solvent is not particularly limited, for example, a compound represented by one of the following formulas (1) to (4) may be mentioned. Since the nitrogen-containing solvent as described above is used, the image quality, the abrasion resistance, and the clogging recovery property tend to be further improved.

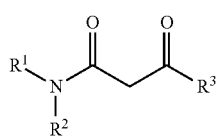

(1)

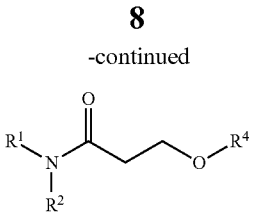

(2)

(3)

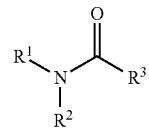

(4)

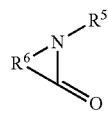

In the formulas, $R^1$ and $R^2$ each independently represent a hydrogen atom or an alkyl group having 1 to 5 carbon atoms, $R^3$ represents a hydrogen atom or an alkyl group having 1 to 5 carbon atoms, $R^4$ represents an alkyl group having 1 to 5 carbon atoms, $R^5$ represents a hydrogen atom or one of an alkyl group and an alkenyl group each having 1 to 6 carbon atoms, and $R^6$ represents an alkylene group having 1 to 6 carbon atoms which functions as a part of a cyclic amide ring.

In the formula (1), at least one of $R^1$ and $R^2$ preferably represents an alkyl group having 1 to 5 carbon atoms, and $R^1$ and $R^2$ each more preferably represent an alkyl group having 1 to 5 carbon atoms. $R^1$, $R^2$, and $R^3$ each represent preferably an alkyl group having 1 to 4 carbon atoms, more preferably an alkyl group having 1 to 3 carbon atoms, and further preferably an alkyl group having 1 to 2 carbon atoms.

Although the non-cyclic amide represented by the formula (1) is not particularly limited, for example, N,N-dimethylacetoacetamide (DMAA), N,N-diethylacetoacetamide, or N-methyl-acetoacetamide may be mentioned.

In the formula (2), at least one of $R^1$ and $R^2$ preferably represents an alkyl group having 1 to 5 carbon atoms, and $R^1$ and $R^2$ each more preferably represent an alkyl group having 1 to 5 carbon atoms. $R^1$, $R^2$, and $R^4$ each represent preferably an alkyl group having 1 to 4 carbon atoms, more preferably an alkyl group having 1 to 3 carbon atoms, and further preferably an alkyl group having 1 to 2 carbon atoms. In addition, an alkyl group having 3 to 5 carbon atoms is also preferable.

Although the non-cyclic amide represented by the formula (2) is not particularly limited, for example, there may be mentioned an alkoxyalkylamide, such as N,N-dimethyl-β-methoxypropionamide (DMPA), N,N-dimethyl-β-butoxy-propionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, or 3-tert-butoxy-N,N-methylethylpropionamide.

In the formula (3), at least one of $R^1$ and $R^2$ preferably represents an alkyl group having 1 to 5 carbon atoms, and $R^1$ and $R^2$ each more preferably represent an alkyl group having 1 to 5 carbon atoms. $R^1$, $R^2$, and $R^3$ each represent preferably an alkyl group having 1 to 4 carbon atoms, more preferably an alkyl group having 1 to 3 carbon atoms, and further preferably an alkyl group having 1 to 2 carbon atoms. In addition, an alkyl group having 3 to 5 carbon atoms is also preferable.

Although the non-cyclic amide represented by the formula (3) is not particularly limited, for example, there may be mentioned N,N-dimethyl-isobutyramide (DMIB), N,N-dimethylformamide (DMF), N,N-diethylformamide, N,N-dimethylacetamide, N,N-diethylacetamide, or N,N-dimethylpropionamide.

In the formula (4), $R^5$ preferably represents a hydrogen atom or an alkyl group having 1 to 6 carbon atoms. The alkyl group may be a cycloalkyl group. $R^5$ represents more preferably a hydrogen atom or an alkyl group having 1 to 3 carbon atoms and further preferably a hydrogen atom. $R^6$ represents preferably an alkylene group having 3 to 5 carbon atoms and more preferably an alkylene group having 3 to 4 carbon atoms.

Although the cyclic amide represented by the formula (4) is not particularly limited, for example, there may be mentioned 2-pyrrolidone (2P), N-methyl-2-pyrrolidone, N-ethyl-2-pyrrolidone, N-vinyl-2-pyrrolidone, N-butyl-2-pyrrolidone, 5-methyl-2-pyrrolidone, ε-caprolactam (CPL), 1-cyclohexyl-2-pyrrolidone, 2-piperidone, N-methyl-ε-caprolactam, β-propiolactam, or ω-heptalactam.

In addition, although a nitrogen-containing solvent other than those mentioned above is not particularly limited, for example, there may be mentioned 1-(2-hydroxyethyl)-2-pyrrolidone (HEP), 1-methyl-4-piperidone, 1,3-dimethylurea, 1,3-diethylurea, tetramethylurea, 1,3-dimethyl-2-imidazolidinone, N,N-dimethylpropyleneurea, 3-methyl-2-oxazolidinone, or 2-oxazolidinone.

1.2.2.2. Sulfur-Containing Solvent

The sulfur-containing solvent is an organic solvent including a sulfur atom in its molecule. Although the sulfur-containing solvent is not particularly limited, for example, there may be mentioned a sulfone, such as sulfolane, 3-methylsulfolane, ethyl isopropyl sulfone, ethyl methyl sulfone, or dimethyl sulfone; a sulfoxide, such as dimethyl sulfoxide, tetramethylene sulfoxide, diethyl sulfoxide, or methyl phenyl sulfoxide; or 1,3-propanesultone.

1.2.2.3. Cyclic Ester

The cyclic ester is a compound including a cyclic structure formed by an ester bond. As the cyclic structure, at least three-membered ring is preferable, a three- to eight-membered ring is more preferable, and a five- to seven-membered ring is further preferable.

Although the cyclic ester is not particularly limited, for example, γ-lactone having a five-membered ring structure, δ-lactone having a six-membered ring structure, or ε-lactone having a seven-membered ring structure may be mentioned. In particular, for example, there may be mentioned a lactone, such as γ-butyrolactone, γ-valerolactone, γ-hexalactone, γ-heptalactone, γ-octalactone, γ-nonalactone, γ-decalactone, γ-undecalactone, δ-valerolactone, δ-hexalactone, δ-heptalactone, δ-octalactone, δ-nonalactone, δ-decalactone, or δ-undecalactone; or a cyclic carbonate, such as propylene carbonate, ethylene carbonate, or butylene carbonate.

1.2.2.4. Glycol Diether

The glycol diether is a diether in which two hydroxy groups of a glycol compound are each etherized. As the glycol compound, for example, an alkanediol or an intermolecular OH condensate between alkanediols may be mentioned. In the alkanediol or the intermolecular OH condensate between alkanediols, the alkane diol has preferably 1 to 5 carbon atoms and more preferably 1 to 2 carbon atoms. As an etherized portion, for example, an alkyl ether or an aryl ether may be mentioned, an alkyl ether is preferable, an alkyl ether formed by an alkyl having 1 to 5 carbon atoms is more preferable, and alkyl ether formed by an alkyl having 1 to 4 carbon atoms is further preferable.

Although the glycol diether is not particularly limited, for example, there may be mentioned ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, or dipropylene glycol diethyl ether.

1.2.2.5. Cyclic Ether

The cyclic ether is a compound having a cyclic structure which includes an ether bond. As the cyclic structure, at least three-membered ring is preferable, a three- to eight-membered ring is more preferable, and a five- to seven-membered ring is further preferable. The cyclic structure may also be a polycyclic structure.

Although the cyclic ether is not particularly limited, for example, 3-methyl-3-hydroxymethyloxetane, 3-ethyl-3-hydroxymethyloxetane, 2-hydroxymethyloxetane, solketal, isosorbide dimethyl ether (DMIS), dihydrolevoglucosenone, isosorbide, glycerol formal, or 1,4-dioxane-2,3-diol may be mentioned.

1.3. Others Relating to Organic Solvent

In view of the abrasion resistance and the clogging recovery property, in the ink composition of this embodiment, an organic solvent which is a diol or a polyol having a standard boiling point of more than 280° C. is not contained in an amount of preferably more than 3 percent by mass, more preferably more than 2 percent by mass, even more preferably more than 1 percent by mass, and particularly preferably more than 0.5 percent by mass, and furthermore, the organic solvent described above is preferably not contained at all. In addition, a content of all the organic solvents each having a standard boiling point of more than 280° C. is also preferably set in the range described above.

In addition, in view of the abrasion resistance and the clogging recovery property, an organic solvent having a standard boiling point of less than 150° C. is preferably not contained in an amount of more than 3 percent by mass and is more preferably not contained at all.

In addition, although the ink composition of this embodiment may contain organic solvents having a standard boiling point of more than 250° C. or less than 150° C., a content of all the organic solvents described above is preferably set in the range described above. In this case, it is preferable in terms of the abrasion resistance and the clogging recovery property.

A content of the organic solvent having a standard boiling point of more than 250° C. in the ink composition is preferably 15 percent by mass or less, more preferably 10 percent by mass or less, even more preferably 5 percent by mass or less, further preferably 3 percent by mass or les, and even further preferably 1 percent by mass or less. The lower limit is 0 percent by mass or more. In this case, it is preferable, for example, since the image quality, the clogging recovery property, and the abrasion resistance are further improved.

In addition, a content of the organic solvent having a standard boiling point of more than 250° C. or less than 150° C. may be set in the range described above.

1.4. Water

The aqueous ink is an ink containing at least water as a solvent component.

A content of the water with respect to the total mass of the ink composition is preferably 40 percent by mass or more and more preferably 40 to 93.5 percent by mass. Furthermore, the content described above is preferably 50 to 80 percent by mass, more preferably 55 to 75 percent by mass, and further preferably 60 to 70 percent by mass.

1.5. Pigment

The pigment is not particularly limited, and for example, there may be mentioned a carbon black (C.I. Pigment Black 7), such as a furnace black, a lamp black, an acetylene black, or a channel black; an inorganic pigment, such as an iron oxide or a titanium oxide; or an organic pigment, such as a quinacridone-based pigment, a quinacridone quinone-based pigment, a dioxazine-based pigment, a phthalocyanine-based pigment, an anthrapyrimidine-based pigment, an anthranthrone-based pigment, an indanthrone-based pigment, a flavanthrone-based pigment, a perylene-based pigment, a diketopyrrolopyrrole-based pigment, a perinone-based pigment, a quinophthalone-based pigment, an anthraquinone-based pigment, a thioindigo-based pigment, a benzimidazolone-based pigment, an isoindolinone-based pigment, an azomethine-based pigment, or an azo-based pigment. The pigments may be used alone, or at least two types thereof may be used in combination.

A content of the pigment with respect to the total mass of the ink composition is preferably 0.5 to 15 percent by mass, more preferably 1 to 10 percent by mass, and further preferably 1 to 6 percent by mass. In addition, in this specification, a content of a solid component at ordinary temperature indicates a solid content unless otherwise particularly noted.

1.6. Fixing Resin

The ink composition of this embodiment may further contain a fixing resin. Since the fixing resin is contained, although the abrasion resistance of the recorded matter is improved, the effect of the fixing resin is not limited thereto.

As the fixing resin, for example, there may be mentioned a resin contained in the ink in a dispersion state, such as resin particles or a resin emulsion, or a resin dissolved in a solvent component of the ink in a dissolution state. As the resin particles in the dissolution state, for example, a water-soluble resin to be dissolved in water may be mentioned. The resin particles contained in the ink in the dispersion state are preferable since the abrasion resistance is more superior.

Although the fixing resin is not particularly limited, for example, there may be mentioned an urethane resin, an acrylic-based resin, a polyester-based resin, a fluorene-based resin, a polyolefin-based resin, a rosin-modified resin, a terpene-based resin, a polyamide-based resin, an epoxy-based resin, a vinyl chloride-based resin, or an ethylene-vinyl acetate-based resin. The fixing resins may be used alone, or at least two types thereof may be used in combination.

The acrylic-based resin may also be a copolymer between an acrylic-based monomer and another monomer and is particularly preferably a copolymer with a vinyl monomer.

Among those mentioned above, the acrylic-based resin is preferable, and a styrene-acrylic resin or a silicone-acrylic resin is more preferable. By using the fixing resin as described above, the image quality, the abrasion resistance, and the clogging recovery property tend to be further improved.

A glass transition temperature of the fixing resin is preferably 50° C. to 110° C., more preferably 60° C. to 110° C., and further preferably 70° C. to 110° C. Since the glass transition temperature of the fixing resin is in the range described above, the abrasion resistance tends to be further improved.

A content of the fixing resin with respect to the total mass of the ink composition is preferably 1.0 to 12.5 percent by mass, more preferably 2.5 to 10 percent by mass, and further preferably 5.0 to 7.5 percent by mass. Since the content of the fixing resin is in the range described above, the abrasion resistance tends to be further improved.

In addition, when the silicone-acrylic resin is used, a content thereof with respect to the total mass of the ink composition is preferably 0.1 to 3.0 percent by mass, more preferably 0.1 to 1.5 percent by mass, and further preferably 0.1 to 1.0 percent by mass. Since the content of the silicone-acrylic resin is in the range described above, the abrasion resistance tends to be further improved.

1.7. Wax

The ink composition of this embodiment may further contain a wax. Although the wax is not particularly limited, for example, there may be mentioned a plant/animal-based wax, such as a carnauba wax, a candelilla wax, a bee wax, a rice wax, or a lanolin; a mineral-based wax, such as a montan wax or an ozokerite; a so-called petroleum-based wax such as a paraffin wax; a synthetic wax, such as a carbon wax, a Hoechst wax, a polyolefin wax, a silicone wax, or an amide stearate; a natural/synthetic wax emulsion, such as an α-olefin/maleic anhydride copolymer; or a formulated wax.

Among those waxes mentioned above, for example, the silicone wax, the polyolefin wax, or the paraffin wax is preferable, and the polyolefin wax is more preferable. When the wax as described above is used, the abrasion resistance tends to be further improved.

A content of the wax with respect to the total mass of the ink composition is preferably 0.1 to 1.2 percent by mass, more preferably 0.2 to 1.0 percent by mass, and further preferably 0.3 to 0.7 percent by mass. Since the content of the wax is in the range described above, the abrasion resistance tends to be further improved.

1.8. Defoaming Agent

The ink composition of this embodiment may further contain a defoaming agent. Although the defoaming agent is not particularly limited, for example, there may be mentioned a silicone-based defoaming agent, a polyether-based defoaming agent, a fatty acid ester-based defoaming agent, or an acetylene glycol-based defoaming agent. As a commercially available defoaming agent, for example, there may be mentioned BYK-011, BYK-012, BYK-017, BYK-018, BYK-019, BYK-020, BYK-021, BYK-022, BYK-023, BYK-024, BYK-025, BYK-028, BYK-038, BYK-044, BYK-080A, BYK-094, BYK-1610, BYK-1615, BYK-1650, BYK-1730, or BYK-1770 (trade name, manufactured by BYK Japan KK); or Surfynol DF37, DF110D, DF58, DF75, DF220, or MD-20, or EnviroGem AD01 (trade name, manufactured by Nisshin Chemical Industry Co., Ltd.). The defoaming agents may be used alone, or at least two types thereof may be used in combination.

A content of the defoaming agent with respect to the total mass of the ink composition is preferably 0.03 to 0.7 percent by mass, more preferably 0.05 to 0.5 percent by mass, and further preferably 0.08 to 0.3 percent by mass.

1.9. Surfactant

Although a surfactant is not particularly limited, for example, there may be mentioned an acetylene glycol-based surfactant, a fluorine-based surfactant, or a silicone-based surfactant. Among those mentioned above, the silicone-based surfactant or the fluorine-based surfactant is preferable. The surfactants may be used alone, or at least two types thereof may be used in combination.

Although the acetylene glycol-based surfactant is not particularly limited, for example, 2,4,7,9-tetramethyl-5-decyne-4,7-diol, an alkylene oxide adduct thereof, 2,4-dimethyl-5-decyne-4-ol, or an alkylene oxide adduct thereof may be mentioned.

Although the fluorine-based surfactant is not particularly limited, for example, there may be mentioned a perfluoroalkyl sulfonate, a perfluoroalkyl carboxylate, a perfluoroalkyl phosphate, a perfluoroalkyl ethylene oxide adduct, a perfluoroalkyl betaine, or a perfluoroalkyl amine oxide compound.

As the silicone-based surfactant, for example, a polysiloxane-based compound or a polyether modified organosiloxane may be mentioned.

A content of the surfactant with respect to the total mass of the ink composition is preferably 0.1 to 4.0 percent by mass, more preferably 0.5 to 2.0 percent by mass, and further preferably 0.7 to 1.5 percent by mass.

1.10. Recording Medium

A recording medium to which the ink composition of this embodiment is adhered is a low-absorbing recording medium or a non-absorbing recording medium. The low-absorbing recording medium and the non-absorbing recording medium indicate a recording medium hardly absorbing an ink and a recording medium absorbing no ink, respectively. From a quantitative point of view, the recording medium used in this embodiment indicates a "recording medium having a water absorbing amount of 10 mL/m$^2$ or less from a contact start to a point of 30 msec$^{1/2}$ by Bristow method". The details of the test method has been disclosed in Standard No. 51 "Paper and Paperboard-Liquid Absorption Test Method-Bristow Method", JAPAN TAPPI PAPER AND PULP TEST METHODS, 2000. As a recording medium having the non-absorbing property as described above, for example, there may be mentioned a recording medium including a recording surface on which an ink receiving layer having an ink absorbing property is not provided or a recording medium including a recording surface on which a coating layer having a low ink absorbing property is provided.

Although the non-absorbing recording medium is not particularly limited, for example, a plastic film having no ink absorbing layer, a sheet in which a plastic is coated on a base material such as paper, or a sheet in which a plastic film is adhered to a base material may be mentioned. As the plastic in this case, a resin selected, for example, from a poly(vinyl chloride), a polyester such as a poly(ethylene terephthalate), a polycarbonate, a polystyrene, a polyurethane, and a polyolefin, such as a polyethylene or a polypropylene, may be mentioned. As the non-absorbing recording medium, for example, resin films formed from those resins may be mentioned.

Although the low-absorbing recording medium is not particularly limited, for example, coating paper having a surface provided with a coating layer to receive an oily ink may be mentioned. The coating paper is not particularly limited, and for example, printing paper, such as art paper, coated paper, or matte paper, may be mentioned.

1.11. Treatment Liquid

The ink composition of this embodiment may be an ink composition to be used for recording together with a treatment liquid which contains an aggregating agent. Since the treatment liquid is used, a component of the ink composition can be aggregated, and the flow of the ink dots can be further suppressed, so that the image quality of the recorded matter to be obtained tends to be further improved. In addition, in this embodiment, an ink set including the ink composition described above and the treatment liquid may be provided. The ink set indicates a set including the ink composition and the treatment liquid which are used together for recording.

In addition, although the treatment liquid contains an aggregating agent, when the treatment liquid is used, amounts of water and an organic solvent to be adhered to a recording medium are increased, and as a result, the flow of the ink dots may be not appropriately suppressed in some cases; hence, as described in the present disclosure, the ink composition itself preferably has the pinning effect.

In addition, even when the component of the ink is aggregated by the aggregating agent, while a solvent component, such as water and an organic solvent, is not vaporized yet, an aggregate may be allowed to flow, and the image quality may be degraded in some cases; however, according to the present disclosure, even if the solvent component is not vaporized yet, the flow of the aggregate can be suppressed, and as a result, the image quality is improved.

The treatment liquid contains the aggregating agent and if need, may also contain an organic solvent, water, a surfactant, and/or an amine. Hereinafter, the components of the treatment liquid will be described in detail.

1.11.1. Aggregating Agent

Although the aggregating agent is not particularly limited as long as capable of aggregating the component of the ink composition, for example, a polyvalent metal salt, an organic acid, or a cationic resin may be mentioned. The aggregating agents may be used alone, or at least two types thereof may be used in combination.

Although the polyvalent metal salt is not particularly limited, for example, a polyvalent metal salt of an inorganic acid or a polyvalent metal salt of an organic acid may be mentioned. Although the polyvalent metal is not particularly limited, for example, there may be mentioned an alkaline earth metal (such as magnesium or calcium) of the Group II of the periodic table, a transition metal (such as lanthanum) of the Group III of the periodic table, an earth metal (such as aluminum) of the Group XIII of the periodic table, or a lanthanide (such as neodymium). As the salt of the polyvalent metal mentioned above, a carboxylic acid salt (such as a formate salt, an acetate salt, or a benzoate salt), a sulfate, a nitrate, a chloride, or a thiocyanate is preferable. Among those mentioned above, a calcium salt or a magnesium salt of a carboxylic acid (such as formic acid, acetic acid, or benzoic acid), a calcium salt or a magnesium salt of a sulfuric acid, a calcium salt or a magnesium salt of a nitric acid, calcium chloride, magnesium chloride, or a calcium salt or a magnesium salt of a thiocyanic acid may be mentioned. In addition, the polyvalent metal salts may be used alone, or at least two types thereof may be used in combination.

Although the organic acid is not particularly limited, for example, acetic acid, oxalic acid, malonic acid, or citric acid may be mentioned. Among those mentioned above, a monovalent or divalent carboxylic acid is preferable. In addition, the organic acid may be present in the form of salt. In addition, the organic acid or its salt may be used alone, or at least two types thereof may be used in combination. An organic acid salt which is also a polyvalent metal salt is to be categorized in the polyvalent metal salt.

Although the cationic resin is not particularly limited, for example, an amine-based polymer, such as an amine/epichlorohydrin condensation polymer, a polyallylamine, or a polyallylamine derivative may be mentioned. As the cationic resin, a resin to be dissolved in the treatment liquid or a resin to be dispersed in the treatment liquid in a resin emulsion state or the like is preferable, and the former is more preferable.

A content of the aggregating agent with respect to the total mass of the treatment liquid is preferably 1.0 to 10 percent by mass, more preferably 3.0 to 10 percent by mass, and further preferably 3.0 to 7.0 percent by mass.

1.11.2. Amine

As the amine, for example, an amine similar to the amine described by way of example in the above ink composition may be mentioned. The amine used in the treatment liquid may be the same as or different from the amine used in the ink composition. By using the amine as described above, the image quality and the abrasion resistance tend to be further improved.

A content of the amine with respect to the total mass of the treatment liquid is preferably 0.01 percent by mass or more, more preferably 0.02 to 1 percent by mass, even more preferably 0.03 to 0.5 percent by mass, further preferably 0.05 to 0.3 percent by mass, and even further preferably 0.05 to 0.1 percent by mass.

Since the content of the amine is in the range described above, the image quality and the abrasion resistance tend to be further improved.

1.11.3. Organic Solvent

As the organic solvent, for example, an organic solvent similar to the organic solvent described by way of example in the above ink composition may be mentioned. The organic solvent used for the treatment liquid may be the same as or different from that used for the ink composition. Among those mentioned above, the treatment liquid preferably contains the organic solvent having a standard boiling point of 150° C. to 250° C. and/or the resin solvent. Since the organic solvent as described above is used, the image quality and the abrasion resistance tend to be further improved.

A content of the organic solvent having a standard boiling point of 150° C. to 250° C. with respect to the total mass of the treatment liquid is preferably 5 to 30 percent by mass, more preferably 10 to 30 percent by mass, and further preferably 15 to 30 percent by mass. Since the content of the organic solvent having a standard boiling point of 150° C. to 250° C. is in the range described above, the image quality and the abrasion resistance tend to be further improved.

When the treatment liquid contains the resin solvent, the content of the resin solvent of the ink composition is preferably larger than the content of the resin solvent of the treatment liquid. Accordingly, the image quality and the abrasion resistance tend to be further improved.

1.11.4. Water

The treatment liquid is preferably an aqueous liquid as is the case of the ink. A content of the water with respect to the total mass of the treatment liquid is preferably 40 percent by mass or more, more preferably 40 to 99 percent by mass, even more preferably 50 to 80 percent by mass, further preferably 55 to 75 percent by mass, and even further preferably 60 to 70 percent by mass.

1.11.5. Defoaming Agent

As the defoaming agent, for example, a deforming agent similar to that described by way of example in the above ink composition may be mentioned. A content of the defoaming agent with respect to the total mass of the treatment liquid is preferably 0.03 to 0.7 percent by mass, more preferably 0.05 to 0.5 percent by mass, and further preferably 0.08 to 0.3 percent by mass.

1.11.6. Surfactant

As the surfactant, for example, a surfactant similar to that described by way of example in the above ink composition may be mentioned. A content of the surfactant with respect to the total mass of the treatment liquid is preferably 0.1 to 2.5 percent by mass, more preferably 0.5 to 2.0 percent by mass, and further preferably 0.7 to 1.5 percent by mass.

2. Recording Method

A recording method of this embodiment includes an ink adhesion step of ejecting the ink composition described above by an ink jet method so as to be adhered to a low-absorbing recording medium or a non-absorbing recording medium. The recording method of this embodiment may further include, if needed, a treatment liquid adhesion step of adhering the treatment liquid containing an aggregating agent to the low-absorbing recording medium or the non-absorbing recording medium, a pre-drying step (primary drying step) of drying the ink at an early stage, for example, by heating the low-absorbing recording medium or the non-absorbing recording medium before or during the ink adhesion step, a post-heating step (secondary drying step) of heating the low-absorbing recording medium or the non-absorbing recording medium after the ink adhesion step, and the like.

2.1. Ink Adhesion Step

The ink adhesion step is a step of ejecting the ink composition described above by an ink jet method so as to be adhered to the low-absorbing recording medium or the non-absorbing recording medium. The ejection of the ink composition by an ink jet method may be performed by using a known ink jet recording apparatus. Although an ejection method is not particularly limited, for example, a piezoelectric method or a method in which an ink is ejected by bubbles generated by heating the ink may be used.

2.2. Treatment Liquid Adhesion Step

The treatment liquid adhesion step is a step of adhering the treatment liquid containing an aggregating agent to the low-absorbing recording medium or the non-absorbing recording medium. By the treatment liquid adhesion step, since the component of the ink composition is likely to be aggregated on a surface of the recording medium, and the abrasion resistance and the image quality are further improved.

As an adhesion method of the treatment liquid, besides an adhesion method using an ink jet method similar to that described above, application may be performed by a bar coater, a roll coater, a spray, or the like. In addition, as the ink jet method, a method similar to the ejection method of the ink composition may also be mentioned by way of example.

The treatment liquid adhesion step may be performed either before or after the ink adhesion step. In addition, when the treatment liquid adhesion step is performed before the ink adhesion step, the ink adhesion step may be performed before the treatment liquid is dried or after the treatment liquid is dried. Furthermore, when the treatment liquid adhesion step is performed after the ink adhesion step, the treatment liquid adhesion step is preferably performed before the ink composition is dried.

2.3. Pre-Drying Step

The pre-drying step is a step of drying the low-absorbing recording medium or the non-absorbing recording medium before, during, or immediately after the ink adhesion step is performed by performing heating or ventilation on the low-absorbing recording medium or the non-absorbing recording medium so as to dry the ink at an early stage. Although a heating unit to heat the recording medium is not particularly limited, for example, a platen heater, a hot wind heater, or an IR heater, each of which includes a heating mechanism, or an air blower including no heating mechanism may be mentioned.

A surface temperature of the low-absorbing recording medium or the non-absorbing recording medium in the ink adhesion step is preferably 25° C. or more. On the other hand, the surface temperature described above is preferably 55° C. or less. The surface temperature described above is more preferably 28° C. to 55° C., even more preferably 28° C. to 50° C., further preferably 30° C. to 50° C., and even further preferably 35° C. to 45° C., and particularly preferably 35° C. to 40° C.

Since the surface temperature of the recording medium is in the range described above, the image quality of the recorded matter to be obtained, the clogging recovery property, and the abrasion resistance tend to be further improved.

The temperature described above indicates a temperature of the pre-drying step when the pre-drying step is provided.

2.4. Post-Heating Step

The post-heating step is a step of heating the low-absorbing recording medium or the non-absorbing recording medium after the ink adhesion step. A surface temperature of the low-absorbing recording medium or the non-absorbing recording medium in this case is preferably 60° C. to 120° C., more preferably 70° C. to 110° C., and further preferably 80° C. to 100° C. Since the surface temperature of the recording medium is in the range described above, the image quality and the abrasion resistance of the recorded matter to be obtained tend to be further improved.

3. Recording Apparatus

As one example of an ink jet apparatus, FIGURE shows a perspective view of a serial printer. As shown in FIGURE, a serial printer 20 includes a transport portion 220 and a recording portion 230. The transport portion 220 transports a recording medium F which is supplied to the serial printer to the recording portion 230 and discharges the recording medium on which recording is performed to the outside of the serial printer. In particular, the transport portion 220 includes a plurality of rollers and transports the recording medium F thus supplied in a sub-scanning direction T1.

In addition, the recording portion 230 includes a carriage 234 mounting an ink jet head 231 which has at least one nozzle to eject the ink composition and at least one nozzle to eject the treatment liquid to the recording medium F transported from the transport portion 220 and a carriage transfer mechanism 235 which transfers the carriage 234 in a main-scanning direction S1 and S2 of the recording medium F.

In the case of the serial printer, a head having a length smaller than the width of the recording medium is provided as the ink jet head 231, and the head is transferred to perform recording by a plurality of passes (multipass). In addition, in the serial printer, the head 231 is mounted on the carriage 234 which is transferred in a predetermined direction, and when the head is transferred in association with the transfer of the carriage, the ink composition and the treatment liquid are ejected on the recording medium. Accordingly, the recording is performed by at least two passes (multipass). In addition, the pass is also called a main-scanning operation. Between the passes, a sub-scanning operation to transport the recording medium is performed. That is, the main-scanning operation and the sub-scanning operation are alternately performed.

In addition, the ink jet apparatus of this embodiment is not limited to the serial type printer described above, and a line type printer may also be used. The line type printer is a printer which uses, as the ink jet head, a line head having a length larger than a recording width of the recording medium and which performs recording on the recording medium by one scanning operation.

Examples

Hereinafter, the present disclosure will be described in detail with reference to Examples and Comparative Examples. However, the present disclosure is not limited to the following Examples.

1. Preparation of Ink Composition

Components were mixed together to obtain the compositions shown in the following Tables 1 and 2, so that ink compositions were obtained. In addition, in Tables 1 and 2, the contents of the components are each represented by percent by mass.

TABLE 1

| | | BOILING POINT (° C.) | WATER MIXTURE VISCOSITY (mPa·s) | INK |  |  |  |  |  |  |  |  |
|---|---|---|---|---|---|---|---|---|---|---|---|---|
| | | | | A | B | C | D | E | F | G | H | I |
| AMINE | TIPA | 301 | 4.8 | 1.5 | 1.5 | 1.5 | 1.5 | 1.5 | 1.5 | | 2.8 | 3.3 |
| | TEA | 335 | 3.5 | | | | | | | 1.5 | | |
| ORGANIC SOLVENT (DIOL HAVING BOILING POINT OF 150° C. TO 250° C.) | DPG | 232 | 4 | 6 | | | | | | 6 | 6 | 6 |
| | 1,3BD | 204 | 3.8 | | 6 | | | | | | | |
| | PG | 188 | 3.3 | | | 6 | | 13 | 13 | | | |
| | PDO | 214 | 2.9 | | | | 6 | | | | | |
| ORGANIC SOLVENT (RESIN SOLVENT) | DMAA | 220 | 2.4 | 14 | 14 | 14 | 14 | 14 | 14 | 14 | 14 | 14 |
| | DMPA | 215 | 2.8 | | | | | | | | | |
| | DMIB | 175 | 3 | | | | | | | | | |
| | 2P | 245 | 2.5 | | | | | | | | | |
| | DMSO | 180 | 2.2 | | | | | | | | | |
| | GBL | 204 | 1.7 | | | | | | | | | |
| | DEDG | 188 | 3.5 | | | | | | | | | |
| | DMIS | 240 | 2.4 | | | | | | | | | |

TABLE 1-continued

| | | | | | | | | | | |
|---|---|---|---|---|---|---|---|---|---|---|
| PIGMENT DISPERSION LIQUID | CYAN PIGMENT DISPERSION LIQUID (SOLID CONTENT) | 4 | 4 | 4 | 4 | 4 | 4 | 4 | 4 | 4 |
| RESIN | JONCRYL 631 (SOLID CONTENT) | 6 | 6 | 6 | 6 | 6 | 6 | 6 | 6 | 6 |
| | CHALINE LC-190 (SOLID CONTENT) | | | | | | 0.5 | | | |
| WAX | HI-TECH E-6500 (SOLID CONTENT) | 0.5 | 0.5 | 0.5 | 0.5 | 0.5 | 0.5 | 0.5 | 0.5 | 0.5 |
| DEFOAMING AGENT | SURFYNOL DF110D | 0.2 | 0.2 | 0.2 | 0.2 | 0.2 | 0.2 | 0.2 | 0.2 | 0.2 |
| SURFACTANT | BYK348 | 1 | 1 | 1 | 1 | 1 | 1 | 1 | 1 | 1 |
| | WATER | BALANCE | BALANCE | BALANCE | BALANCE | BALANCE | BALANCE | BALANCE | BALANCE | BALANCE |
| | TOTAL | 100 | 100 | 100 | 100 | 100 | 100 | 100 | 100 | 100 |
| | TOTAL AMOUNT OF ORGANIC SOLVENTS HAVING STANDARD BOILING POINT OF 150° C. TO 250° C. (PERCENT BY MASS) | 20 | 20 | 20 | 20 | 27 | 27 | 20 | 20 | 20 |
| | TOTAL AMOUNT OF AMINES (PERCENT BY MASS) | 1.5 | 1.5 | 1.5 | 1.5 | 1.5 | 1.5 | 1.5 | 2.8 | 3.3 |
| | AMOUNT OF SILICONE SURFACTANT | 1 | 1 | 1 | 1 | 1 | 1 | 1 | 1 | 1 |
| | STORAGE STABILITY (CHANGE IN SURFACE TENSION) | A | A | A | A | A | A | A | B | C |

| | | BOILING POINT (° C.) | WATER MIXTURE VISCOSITY (mPa·s) | INK J | K | L | M | N | O | P | Q |
|---|---|---|---|---|---|---|---|---|---|---|---|
| AMINE | TIPA | 301 | 4.8 | 0.8 | 1.5 | 1.5 | 1.5 | 1.5 | 1.5 | 1.5 | 1.5 |
| | TEA | 335 | 3.5 | | | | | | | | |
| ORGANIC SOLVENT (DIOL HAVING BOILING POINT OF 150° C. TO 250° C.) | DPG | 232 | 4 | 6 | 6 | 6 | 6 | 6 | 6 | 6 | 6 |
| | 1,3BD | 204 | 3.8 | | | | | | | | |
| | PG | 188 | 3.3 | | | | | | | | |
| | PDO | 214 | 2.9 | | | | | | | | |
| ORGANIC SOLVENT (RESIN SOLVENT) | DMAA | 220 | 2.4 | 14 | | | | | | | |
| | DMPA | 215 | 2.8 | | 14 | | | | | | |
| | DMIB | 175 | 3 | | | 14 | | | | | |
| | 2P | 245 | 2.5 | | | | 14 | | | | |
| | DMSO | 180 | 2.2 | | | | | 14 | | | |
| | GBL | 204 | 1.7 | | | | | | 14 | | |
| | DEDG | 188 | 3.5 | | | | | | | 14 | |
| | DMIS | 240 | 2.4 | | | | | | | | 14 |
| PIGMENT DISPERSION LIQUID | CYAN PIGMENT DISPERSION LIQUID (SOLID CONTENT) | | | 4 | 4 | 4 | 4 | 4 | 4 | 4 | 4 |
| RESIN | JONCRYL 631 (SOLID CONTENT) | | | 6 | 6 | 6 | 6 | 6 | 6 | 6 | 6 |
| | CHALINE LC-190 (SOLID CONTENT) | | | | | | | | | | |
| WAX | HI-TECH E-6500 (SOLID CONTENT) | | | 0.5 | 0.5 | 0.5 | 0.5 | 0.5 | 0.5 | 0.5 | 0.5 |
| DEFOAMING AGENT | SURFYNOL DF110D | | | 0.2 | 0.2 | 0.2 | 0.2 | 0.2 | 0.2 | 0.2 | 0.2 |
| SURFACTANT | BYK348 | | | 1 | 1 | 1 | 1 | 1 | 1 | 1 | 1 |
| | WATER | | | BALANCE | BALANCE | BALANCE | BALANCE | BALANCE | BALANCE | BALANCE | BALANCE |
| | TOTAL | | | 100 | 100 | 100 | 100 | 100 | 100 | 100 | 100 |
| | TOTAL AMOUNT OF ORGANIC SOLVENTS HAVING STANDARD BOILING POINT OF 150° C. TO 250° C. (PERCENT BY MASS) | | | 20 | 20 | 20 | 20 | 20 | 20 | 20 | 20 |
| | TOTAL AMOUNT OF AMINES (PERCENT BY MASS) | | | 0.8 | 1.5 | 1.5 | 1.5 | 1.5 | 1.5 | 1.5 | 1.5 |
| | AMOUNT OF SILICONE SURFACTANT | | | 1 | 1 | 1 | 1 | 1 | 1 | 1 | 1 |
| | STORAGE STABILITY (CHANGE IN SURFACE TENSION) | | | A | A | A | A | A | A | A | A |

TABLE 2

| | | BOILING POINT (° C.) | WATER MIXTURE VISCOSITY (mPa · s) | INK R | S | T | U | V | W | X | Y |
|---|---|---|---|---|---|---|---|---|---|---|---|
| AMINE | TIPA | 301 | 4.8 | 1.5 | | | | 1.5 | 1.5 | 1.5 | 1.5 |
| | DEA | 268 | 3.8 | | 1.5 | | | | | | |
| | DEEA | 162 | 4.8 | | | 1.5 | | | | | |
| | BDEA | 275 | 4.4 | | | | 1.5 | | | | |
| ORGANIC SOLVENT (DIOL HAVING BOILING POINT OF 150° C. TO 250° C.) | DPG | 232 | 4 | 6 | 6 | 6 | 6 | 6 | 6 | 6 | 4 |
| | DEG | 245 | 2.7 | | | | | | | | |
| ORGANIC SOLVENT (RESIN SOLVENT) | DMAA | 220 | 2.4 | 14 | 14 | 14 | 14 | 4 | | 4 | 4 |
| | CPL | 267 | 3.1 | | | | | 10 | | | |
| | DMF | 153 | 2.1 | | | | | | 14 | | |
| | HEP | 309 | 2.9 | | | | | | | | |
| PIGMENT DISPERSION LIQUID (OTHERS) | TEG | 287 | 3.1 | | | | | | | 10 | |
| | DPM | 188 | 3.6 | | | | | | | | |
| | 1B | 117 | 3.3 | | | | | | | | |
| PIGMENT DISPERSION LIQUID | CYAN PIGMENT DISPERSION LIQUID (SOLID CONTENT) | | | 4 | 4 | 4 | 4 | 4 | 4 | 4 | 4 |
| RESIN | JONCRYL 631 (SOLID CONTENT) | | | 6 | 6 | 6 | 6 | 6 | 6 | 6 | 6 |
| WAX | HI-TECH E-6500 (SOLID CONTENT) | | | 0.5 | 0.5 | 0.5 | 0.5 | 0.5 | 0.5 | 0.5 | 0.5 |
| DEFOAMING AGENT | SURFYNOL DF110D | | | 0.2 | 0.2 | 0.2 | 0.2 | 0.2 | 0.2 | 0.2 | 0.2 |
| SURFACTANT | BYK348 | | | 0.2 | 1 | 1 | 1 | 1 | 1 | 1 | 1 |
| | WATER | | | BALANCE | BALANCE | BALANCE | BALANCE | BALANCE | BALANCE | BALANCE | BALANCE |
| | TOTAL | | | 100 | 100 | 100 | 100 | 100 | 100 | 100 | 100 |
| TOTAL AMOUNT OF ORGANIC SOLVENTS HAVING STANDARD BOILING POINT OF 150° C. TO 250° C. (PERCENT BY MASS) | | | | 20 | 20 | 20 | 20 | 10 | 20 | 10 | 8 |
| TOTAL AMOUNT OF AMINES | | | | 1.5 | 1.5 | 1.5 | 1.5 | 1.5 | 1.5 | 1.5 | 1.5 |
| AMOUNT OF SILICONE SURFACTANT | | | | 0.2 | 1 | 1 | 1 | 1 | 1 | 1 | 1 |
| STORAGE STABILITY (CHANGE IN SURFACE TENSION) | | | | B | A | A | A | A | A | A | A |

| | | BOILING POINT (° C.) | WATER MIXTURE VISCOSITY (mPa · s) | INK Z | AA | AB | AC | AD | AE | AF |
|---|---|---|---|---|---|---|---|---|---|---|
| AMINE | TIPA | 301 | 4.8 | 1.5 | 1.5 | 1.5 | 1.5 | 1.5 | 1.5 | 1.5 |
| | DEA | 268 | 3.8 | | | | | | | |
| | DEEA | 162 | 4.8 | | | | | | | |
| | BDEA | 275 | 4.4 | | | | | | | |
| ORGANIC SOLVENT (DIOL HAVING BOILING POINT OF 150° C. TO 250° C.) | DPG | 232 | 4 | 2 | 15 | | | | | 8 |
| | DEG | 245 | 2.7 | | | | 6 | | | |
| ORGANIC SOLVENT (RESIN SOLVENT) | DMAA | 220 | 2.4 | 2 | 16 | 14 | 14 | 14 | 14 | |
| | CPL | 267 | 3.1 | | | | | | | |
| | DMF | 153 | 2.1 | | | | | | | |
| | HEP | 309 | 2.9 | | | | | | | |
| PIGMENT DISPERSION LIQUID (OTHERS) | TEG | 287 | 3.1 | | | | | 6 | | |
| | DPM | 188 | 3.6 | | | | | | 6 | |
| | 1B | 117 | 3.3 | | | | | | | 6 |
| PIGMENT DISPERSION LIQUID | CYAN PIGMENT DISPERSION LIQUID (SOLID CONTENT) | | | 4 | 4 | 4 | 4 | 4 | 4 | 4 |
| RESIN | JONCRYL 631 (SOLID CONTENT) | | | 6 | 6 | 6 | 6 | 6 | 6 | 6 |

TABLE 2-continued

| | | | | | | | | |
|---|---|---|---|---|---|---|---|---|
| WAX | HI-TECH E-6500 (SOLID CONTENT) | 0.5 | 0.5 | 0.5 | 0.5 | 0.5 | 0.5 | 0.5 |
| DEFOAMING AGENT | SURFYNOL DF110D | 0.2 | 0.2 | 0.2 | 0.2 | 0.2 | 0.2 | 0.2 |
| SURFACTANT | BYK348 | 1 | 1 | 1 | 1 | 1 | 1 | 1 |
| | WATER | BALANCE | BALANCE | BALANCE | BALANCE | BALANCE | BALANCE | BALANCE |
| | TOTAL | 100 | 100 | 100 | 100 | 100 | 100 | 100 |
| TOTAL AMOUNT OF ORGANIC SOLVENTS HAVING STANDARD BOILING POINT OF 150° C. TO 250° C. (PERCENT BY MASS) | | 4 | 31 | 20 | 14 | 20 | 14 | 8 |
| TOTAL AMOUNT OF AMINES | | 1.5 | 1.5 | 1.5 | 1.5 | 1.5 | 1.5 | 1.5 |
| AMOUNT OF SILICONE SURFACTANT | | 1 | 1 | 1 | 1 | 1 | 1 | 1 |
| STORAGE STABILITY (CHANGE IN SURFACE TENSION) | | A | A | A | A | A | A | A |

The abbreviations and the product components used in Tables 1 and 2, and a preparation method of a pigment dispersion liquid are as described below. The water mixture viscosity was measured such that after a mixed liquid was prepared by mixing a compound and water at a mass ratio of 30:70, the viscosity thereof was measured at 20° C. at a shear rate of 200/s by a rheometer (MCR 302, manufactured by Anton Paar). The pigment dispersion liquid and the resin in the table indicate solid contents of the pigment and the resin, respectively.

Amine
TIPA: triisopropanolamine
TEA: triethanolamine
DEA: diethanolamine
DEEA: N,N-diethylethanolamine
BDEA: N-butyldiethanolamine
Diol
DPG: dipropylene glycol
1,3BD: 1,3-butanediol
PG: propylene glycol
PDO: 1,3-propanediol
DEG: diethylene glycol
Nitrogen-Containing Solvent
DMAA: N,N-dimethylacetoacetamide
DMPA: N,N-dimethyl-β-methoxypropionamide
DMIB: N,N-dimethylisobutyramide
2P: 2-pyrrolidone
CPL: ε-caprolactam
DMF: N,N-dimethylformamide
HEP: 1-(2-hydroxyethyl)-2-pyrrolidone
Sulfur-Containing Solvent
DMSO: dimethylsulfoxide
Cyclic Ester
GBL: γ-butyrolactone
Glycol Diether
DEDG: diethylene glycol diethyl ether
Cyclic Ether
DMIS: isosorbide dimethyl ether
Other Solvents
TEG: triethylene glycol
DPM: dipropylene glycol monomethyl ether
1B: 1-butanol
Resin (Resin Emulsion)
Joncryl 631: styrene-acrylic resin, manufactured by BASF Japan, Tg: 105° C.
Chaline LC-190: silicone-acrylic resin, manufactured by Nisshin Chemical Industry Co., Ltd.
Wax (Wax Emulsion)
Hi-Tech E-6500: polyethylene wax, manufactured by Toho Chemical Industry Co., Ltd.

Defoaming Agent
Surfynol DF110D: acetylene diol-based surfactant, manufactured by Nisshin Chemical Industry Co., Ltd.
Surfactant
BYK348: silicone-based surfactant, manufactured by BYK Japan KK.

1.1. Preparation Method of Pigment Dispersion Liquid

After 50 g of methyl ethyl ketone (MEK) was received in a flask equipped with a dripping funnel, a nitrogen-inlet tube, a reflux condenser, a thermometer, and a stirrer, while bubbling was performed with a nitrogen gas, heating was performed to 75° C. In this flask, a mixture including: a monomer containing 75 g of n-butyl methacrylate, 5 g of butyl acrylate, 5 g of 2-hydroxyethyl methacrylate, and 15 g of acrylic acid; 50 g of MEK; and 500 mg of a polymerization initiator (AIBN) was dripped by the dripping funnel for 3 hours. After the dripping was completed, heating reflux was further conducted for 6 hours, and MEK in an amount corresponding to the amount lost by volatilization was added after spontaneous cooling, so that a resin solution (resin solid content: 50 percent by mass, acid value: 117 mg/KOH, weight average molecular weight: 12,000) was obtained. After a predetermined amount of a sodium hydroxide aqueous solution at a concentration of 20 percent by mass was added as a neutralizer to 20 g of the solution described above to neutralize 100% of a salt-generating group, 50 g of a pigment (C.I. Pigment Blue 15:3) was gradually added to the above neutralized solution with stirring and was then kneaded for 2 hours by a bead mill. After 200 g of ion-exchanged water was added to the kneaded material thus obtained and then stirred, under a reduced pressure, MEK was distilled off by heating. Furthermore, the concentration was adjusted with ion-exchanged water, so that a pigment dispersion liquid (pigment solid content: 20 percent by mass) was obtained.

2. Preparation of Treatment Liquid

In order to obtain the compositions shown in the following Table 3, components were mixed together, so that treatment liquids were obtained. In addition, in Table 3, the contents of the components are each represented by percent by mass.

TABLE 3

|  |  | TREATMENT LIQUID A | TREATMENT LIQUID B | TREATMENT LIQUID C |
|---|---|---|---|---|
| ORGANIC SOLVENT | DPG | 6 | 6 | 6 |
|  | DMAA | 20 | 20 | 20 |
| AGGREGATING AGENT | CALCIUM ACETATE HYDRATE | 5 |  |  |
|  | MALONIC ACID |  | 5 |  |
|  | CATIOMASTER PD-7 (SOLID CONTENT) |  |  | 5 |
| DEFOAMING AGENT | SURFYNOL DF110D | 0.2 | 0.2 | 0.2 |
| SURFACTANT | BYK348 | 1 | 1 | 1 |
| AMINE | TIPA | 0.1 | 0.1 | 0.1 |
|  | WATER | BALANCE | BALANCE | BALANCE |
|  | TOTAL | 100 | 100 | 100 |
|  | TOTAL AMOUNT OF ORGANIC SOLVENTS HAVING STANDARD BOILING POINT OF 150° C. TO 250° C. (PERCENT BY MASS) | 26 | 26 | 26 |

The abbreviations and the product components used in Table 3 are as described above. In addition, as the aggregating agent, CatioMaster PD-7 (cationic resin, manufactured by Yokkaichi Chemical Co., Ltd.) was used.

3. Evaluation Method

The ink composition and the treatment liquid described above were filled in a printer equipped with a heater (SC-S40650, modified machine manufactured by Seiko-Epson Corporation) so as to eject the ink composition and the treatment liquid from adjacent nozzle lines of an ink jet head by the same scanning operation.

By using the printer described above, the number of scanning operations was set to 8 times, and a solid pattern (cyan monotone) was recorded on a recording medium (Orajet 3165G-010 (PVC film, ORAFOL Japan Inc.)). In addition, an adhesion amount of the ink composition was set to 12 mg/inch$^2$, and an adhesion amount of the treatment liquid was set to the value shown in Table 4. In addition, a primary drying temperature was set as described in Table 4. In an example at a temperature of 25° C., a primary drying step was not performed.

A secondary drying temperature was set to 90° C. In addition, as the temperature, a temperature of the recording medium was measured by a thermocouple. The temperature is the maximum temperature of a surface of a portion of the recording medium in each step during the recording, the portion of the recording medium being processed by each step. The primary drying step was performed by a platen heater, and the secondary drying step was performed by a secondary drying heater disposed downstream in a transportation direction than the platen.

In addition, the recording resolution (pixel density) for the recording was set to 720×1,440 dpi, and at least one ink droplet was adhered at least one time to each pixel.

3.1. Image Quality

The solid pattern of the printed matter thus obtained was observed by visual inspection, and the image quality thereof was evaluated in accordance with the following evaluation criteria.

Evaluation Criteria

AA: ink is uniformly applied, and no region having a variation in color density is present.

A: a small number of regions having a slight variation in color density are present.

B: a large number of regions having a slight variation in color density are present.

C: a significant number of regions having a large variation in color density are present.

3.2. Abrasion Resistance

The printed matter obtained as described above was left at room temperature for 30 minutes after the printing was performed, and a solid pattern printing portion was then cut to have a rectangular shape of 30×150 mm. Subsequently, after rubbing was performed 50 times using a plain-woven cloth by a Gakushin type abrasion tester (load: 500 g), the degree of peeling of the ink was observed by visual inspection, and the abrasion resistance was evaluated in accordance with the following evaluation criteria.

Evaluation Criteria

AA: No peeling is observed.

A: Rate of peeling area to evaluation area is less than 10%.

B: Rate of peeling area to evaluation area is 10% to less than 50%.

C: Rate of peeling area to evaluation area is 50% or more.

3.3. Clogging Recovery Property

The ink composition was filled in the SC-S40650 modified machine described above, and non-ejection was intentionally generated at the nozzle. In the state described above, recording was performed for 3 hours without ejecting the ink. The recording conditions were set as shown in the table. After the recording was performed, and cleaning was then conducted 3 times, the number of non-ejection nozzles was finally confirmed, and the clogging recovery property was evaluated in accordance with the following evaluation criteria. In addition, in one cleaning, one gram of the ink was ejected from the nozzle line. In addition, the non-ejection of the nozzle was generated by hitting a nozzle surface with Bemcot wetted with water. The number of nozzles of the nozzle line was set to 360.

Evaluation Criteria

AA: No non-ejection nozzles are present.

A: Rate of non-ejection nozzles is less than 2%.

B: Rate of non-ejection nozzles is 2% to less than 4%.

C: Rate of non-ejection nozzles is 4% to less than 6%.

D: Rate of non-ejection nozzles is 6% or more.

3.4. Storage Stability (Surface Tension)

After 50 g of the ink composition was sealed in an aluminum pack with no bubbles mixed therein, the pack was left in a constant-temperature oven at 60° C. for 6 days. The surface tensions of the ink composition were measured before and after the composition was left as described above by an automatic surface tension meter (DY-300, manufactured by Kyowa Interface Science Co., Ltd.), and the difference (Δγ) therebetween was calculated. The measurement was performed in an ordinary temperature environment. The results of the storage stability are shown in Tables 1 and 2.

Evaluation Criteria

A: Δγ is 0.5 mN/m or less.

B: Δγ is more than 0.5 mN/m to 1 mN/m or less.

C: Δγ is more than 1 mN/m.

TABLE 4

| | EXAMPLE | | | COMPARATIVE EXAMPLE | EXAMPLE | | | | COMPARATIVE EXAMPLE | |
|---|---|---|---|---|---|---|---|---|---|---|
| | 1 | 2 | 3 | 1 | 4 | 5 | 6 | 7 | 2 | 3 |
| INK NO. | A | B | C | D | E | F | G | H | I | J |
| TREATMENT LIQUID NO. | — | — | — | — | — | — | — | — | — | — |
| ADHESION AMOUNT OF TREATMENT LIQUID (PERCENT BY MASS TO INK) | — | — | — | — | — | — | — | — | — | — |
| PRIMARY DRYING TEMPERATURE (° C.) | 45 | 45 | 45 | 45 | 45 | 45 | 45 | 45 | 45 | 45 |
| IMAGE QUALITY | A | A | B | C | AA | AA | A | A | A | C |
| ABRASION RESISTANCE | A | A | AA | A | B | A | B | B | C | AA |
| CLOGGING RECOVERY PROPERTY | A | A | B | AA | AA | A | A | AA | AA | C |

| | EXAMPLE | | | | | | | | | | |
|---|---|---|---|---|---|---|---|---|---|---|---|
| | 8 | 9 | 10 | 11 | 12 | 13 | 14 | 15 | 16 | 17 | 18 |
| INK NO. | K | L | M | N | O | P | Q | R | S | T | U |
| TREATMENT LIQUID NO. | — | — | — | — | — | — | — | — | — | — | — |
| ADHESION AMOUNT OF TREATMENT LIQUID (PERCENT BY MASS TO INK) | — | — | — | — | — | — | — | — | — | — | — |
| PRIMARY DRYING TEMPERATURE (° C.) | 45 | 45 | 45 | 45 | 45 | 45 | 45 | 45 | 45 | 45 | 45 |
| IMAGE QUALITY | A | A | A | A | A | A | A | B | B | A | A |
| ABRASION RESISTANCE | A | B | A | B | B | B | A | AA | A | AA | A |
| CLOGGING RECOVERY PROPERTY | A | AA | AA | B | B | B | B | A | B | C | B |

| | EXAMPLE | | | | COMPARATIVE EXAMPLE | | | | | | EXAMPLE | | | | | | |
|---|---|---|---|---|---|---|---|---|---|---|---|---|---|---|---|---|---|
| | 19 | 20 | 21 | 22 | 4 | 5 | 6 | 7 | 8 | 9 | 23 | 24 | 25 | 26 | 27 | 28 | 29 |
| INK NO. | V | W | X | Y | Z | AA | AB | AC | AD | AE | A | A | A | A | A | A | AF |
| TREATMENT LIQUID NO. | — | — | — | — | — | — | — | — | — | — | — | A | B | C | C | C | — |
| ADHESION AMOUNT OF TREATMENT LIQUID (PERCENT BY MASS TO INK) | — | — | — | — | — | — | — | — | — | — | — | 0.1 | 0.1 | 0.1 | 0.1 | 0.2 | — |
| PRIMARY DRYING TEMPERATURE (° C.) | 45 | 45 | 45 | 45 | 45 | 45 | 45 | 45 | 45 | 45 | 40 | 40 | 40 | 40 | 25 | 25 | 45 |
| IMAGE QUALITY | AA | A | B | B | C | AA | C | B | B | B | B | A | B | AA | A | AA | B |
| ABRASION RESISTANCE | A | B | B | B | AA | C | B | C | A | AA | A | B | B | A | B | B | B |
| CLOGGING RECOVERY PROPERTY | AA | B | AA | B | C | B | AA | AA | D | D | AA | A | A | A | AA | AA | B |

4. Evaluation Results

In all the examples of the ink compositions each of which contained 1.2 to 2.9 percent by mass of the amine with respect to the ink, 5 to 30 percent by mass of the organic solvent having a standard boiling point of 150° C. to 250° C. with respect to the ink, and a diol having a standard boiling point of 150° C. to 250° C. and a water mixture viscosity of 3.0 mPa·s or more, a recorded matter excellent in image quality and abrasion resistance could be obtained, and the clogging recovery property was also excellent.

On the other hand, in all the comparative examples which were different from the examples described above, at least one of the image quality, the abrasion resistance, and the clogging recovery property was inferior.

From the results of Examples 1 and 3, among diols having a standard boiling point of 150° C. to 250° C. and a water mixture viscosity of 3.0 mPa·s or more, it was found that according to a diol having a higher standard boiling point and a higher water mixture viscosity, the image quality and the clogging recovery property were more superior, and according to a diol having a lower standard boiling point and a lower water mixture viscosity, the abrasion resistance was more superior.

For example, from the results of Examples 1 and 17, it was found that when the standard boiling point of the amine was higher, the clogging recovery property was more superior, and when the standard boiling point described above was lower, the abrasion resistance was more superior.

For example, from the results of Examples 1, 8 to 14, 19 to 21, and 29, it was found that by using the resin solvent, the abrasion resistance, the image quality, and the like were more superior, and in particular, the nitrogen-containing solvent gave excellent results.

From the results of Examples 23 to 28, it was found that by using the treatment liquid, the image quality was more superior. In addition, it was found that when the primary drying was not performed, or when the primary drying temperature was set to be relatively low, an excellent image quality was obtained.

On the other hand, as shown in Comparative Examples 1 and 6, it was found that since the ink composition containing no diol having a water mixture viscosity of 3.0 mPa·s or more had an insufficient pinning effect, the image quality was inferior.

As shown in Comparative Examples 2 and 3, it was found that the ink composition having an excessively large amount of the amine was inferior in terms of the abrasion resistance, and since the ink composition having an excessively small amount of the amine had an insufficient pinning effect, the image quality was inferior, and the clogging recovery property was also inferior.

Furthermore, as shown in Comparative Examples 4 and 5, it was found that the ink composition having an excessively large amount of the organic solvent having a standard boiling point of 150° C. to 250° C. was inferior in terms of the abrasion resistance, and the ink composition having an excessively small amount of the above organic solvent was inferior in terms of the image quality and was also inferior in terms of the clogging recovery property.

Furthermore, as shown in Comparative Examples 7 to 9, it was found that the ink compositions containing no predetermined diols were inferior in terms of the abrasion resistance and the clogging recovery property.

What is claimed is:

1. An ink composition which is used for recording on a low-absorbing recording medium or a non-absorbing recording medium and which is an aqueous ink jet ink containing a pigment, the ink composition comprising:
   1.2 to 2.9 percent by mass of an amine with respect to a total mass of the ink composition; and
   an organic solvent other than an amine,
   wherein the organic solvent includes an organic solvent having a standard boiling point of 150° C. to 250° C. in an amount of 5 to 30 percent by mass with respect to the total mass of the ink composition, and the organic solvent having the standard boiling point of 150° C. to 250° C. includes a diol having a water mixture viscosity of 3.0 mPa·s or more,
   wherein the organic solvent other than the amine includes at least one resin solvent selected from the group consisting of a nitrogen-containing solvent, a sulfur-containing solvent, a cyclic ether, and a glycol diether,
   the nitrogen-containing solvent is at least one selected from the group consisting of a compound represented by formula (1), a compound represented by formula (3), ε-caprolactam, and 1-(2-hydroxyethyl)-2-pyrrolidone,

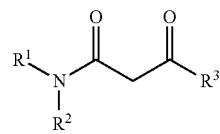

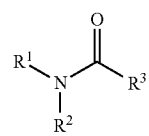

wherein in formulas (1) and (3), R1, R2, and R3 each independently represent a hydrogen atom or an alkyl group having 1 to 5 carbon atoms,
the sulfur-containing solvent is a sulfoxide, and
the cyclic ether is isosorbide dimethyl ether.

2. The ink composition according to claim 1, wherein the amine has a standard boiling point of 250° C. or more.

3. The ink composition according to claim 1, wherein the amine has a water mixture viscosity of 3.0 mPa·s or more.

4. The ink composition according to claim 1, wherein the organic solvent includes neither a diol nor a polyol having a standard boiling point of more than 280° C. in an amount of more than 3 percent by mass.

5. The ink composition according to claim 1, wherein the at least one resin solvent includes at least one of the nitrogen-containing solvents.

6. The ink composition according claim 1, wherein the at least one resin solvent has a standard boiling point of 170° C. to 300° C.

7. The ink composition according to claim 1, wherein the at least one resin solvent has a water mixture viscosity of 2.0 mPa·s or more.

8. The ink composition according to claim 5, wherein the at least one nitrogen-containing solvent contains at least one of ε-caprolactam and 1-(2-hydroxyethyl)-2-pyrrolidone

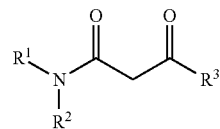

-continued

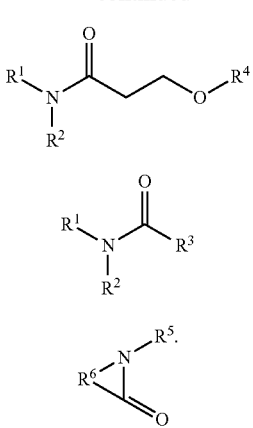

9. The ink composition according to claim 1, wherein a content of the organic solvent is 5 to 40 percent by mass.

10. The ink composition according to claim 1, wherein the ink composition is used for recording in combination with a treatment liquid containing an aggregating agent, and
the treatment liquid contains 5 to 30 percent by mass of an organic solvent having a standard boiling point of 150° C. to 250° C. with respect to a total mass of the treatment liquid.

11. The ink composition according to claim 1, further comprising a fixing resin.

12. The ink composition according to claim 11, wherein the fixing resin has a glass transition temperature of 50° C. to 110° C.

13. A recording method comprising:
an ink adhesion step of ejecting the ink composition according to claim 1 by an ink jet method so as to be adhered to a low-absorbing recording medium or a non-absorbing recording medium.

14. The recording method according to claim 13, further comprising:
a primary drying step of drying the ink composition adhered to the low-absorbing recording medium or the non-absorbing recording medium,
wherein when the ink composition is adhered, the low-absorbing recording medium or the non-absorbing recording medium has a surface temperature of 28° C. to 50° C. by the primary drying step.

15. The recording method according to claim 13, further comprising:
after the ink adhesion step, a post-heating step of heating the low-absorbing recording medium or the non-absorbing recording medium,
wherein the low-absorbing recording medium or the non-absorbing recording has a surface temperature of 60° C. to 120° C. in the post-heating step.

* * * * *